(12) United States Patent
Schmalzhofer (10) Patent No.: US 6,712,543 B1
(45) Date of Patent: Mar. 30, 2004

(54) CONNECTING DEVICE FOR PROFILED BARS WITH GROOVES

(75) Inventor: Rainer Schmalzhofer, Eppingen-Kleingartach (DE)

(73) Assignee: FMS Forder-und Montage-Systeme Schmalzhofer GmbH, Eppingen-Muhlbach (DE)

( * ) Notice: Subject to any disclaimer, the term of this patent is extended or adjusted under 35 U.S.C. 154(b) by 0 days.

(21) Appl. No.: 09/620,675

(22) Filed: Jul. 20, 2000

(30) Foreign Application Priority Data

Jul. 21, 1999 (DE) .................................. 299 12 756 U
Sep. 17, 1999 (DE) .................................. 299 16 259 U
Oct. 9, 1999 (EP) .............................. 99120226

(51) Int. Cl.[7] .................. F16B 7/04; F16B 12/50; F16S 3/04
(52) U.S. Cl. ................ 403/381; 387/260; 387/252; 387/258; 387/187
(58) Field of Search ................ 403/252, 381, 403/387, 187, 255, 236, 258, 231, 260

(56) References Cited

U.S. PATENT DOCUMENTS

| 5,171,098 A | * 12/1992 | Jost .............................. 403/252 |
| 5,192,145 A | * 3/1993 | Rixen et al. ................. 403/255 |
| 5,481,842 A | * 1/1996 | Gautreau ................. 403/231 X |
| 5,746,535 A | * 5/1998 | Kohler ........................ 403/258 |
| 6,273,635 B1 | * 8/2001 | Swanson ..................... 403/299 |

FOREIGN PATENT DOCUMENTS

| DE | 2419092 A1 | * 11/1975 | |
| DE | 3328142 A1 | * 2/1985 | ........... F16B/12/50 |
| DE | 3604989 | * 8/1987 | |
| DE | 3923578 | * 1/1991 | |
| DE | 9205124 U1 | * 10/1992 | |
| DE | 4142273 A1 | * 7/1993 | ............ F16B/7/04 |
| DE | 4039806 | * 1/1994 | |
| DE | 4244396 | * 6/1994 | |
| DE | 195 20 892 A1 | 6/1995 | |
| DE | 99120226.8 | 10/1999 | |
| FR | 2237516 A | * 3/1975 | ........... A47B/96/12 |

* cited by examiner

Primary Examiner—Lynne H. Browne
Assistant Examiner—Ernesto Garcia
(74) Attorney, Agent, or Firm—Darby & Darby (57) ABSTRACT

A connecting device for connecting at least two profiled bars that are essentially perpendicular to one another and have grooves, in conjunction with sliding blocks, one plate connector unit is fastened to the end of a first profiled bar and anchored in a groove in the second profiled bar by way of screw units they extend in recesses in the plate connector unit. The geometry of the screw head of the screw unit is configured such that it centers the screw unit within the groove in the first profiled bar and the engages with a centering effect in the groove in the second profiled bar.

10 Claims, 6 Drawing Sheets

FIG. 11

CONNECTING DEVICE FOR PROFILED BARS WITH GROOVES

TECHNICAL BACKGROUND

The present invention relates to a connecting device for connecting at least two profiled bars that are essentially perpendicular to one another and have grooves, one plate connector unit being fastened to the end of a first profiled bar and the plate connector unit being anchored in a groove in the second profiled bar by means of screw units extending in recesses in the plate connector unit, in conjunction with sliding blocks.

PRIOR ART

A large number of exemplary embodiments for producing a connection between profiled bars with grooves, using a plate connector, are known, but they have the significant drawback that said plate connector is not able to ensure reliable centering of the grooves in the individual profiles connected to one another.

DE 195 20 892 A1 discloses a plate connector for connecting two profiles of the type mentioned at the beginning which are essentially perpendicular to each other. In this case, centering means are formed on the plate connector and, in the assembled state, rest with a positive fit in the grooves in the profiles.

DESCRIPTION OF THE INVENTION

On the basis of the aforementioned prior art, the present invention is based on the object and, respectively, on the technical problem of specifying a connecting device which ensures reliable centering for the connection of two profiled bars with grooves via a plate connector unit, which is easy to mount and can be produced economically.

The connecting device according to the invention is accordingly distinguished by the features of the independent claim 1. Advantageous refinements and developments are the subject of the dependent claims.

The connecting device according to the invention is accordingly distinguished by the fact that the geometry of the screw head of the screw unit is designed such that it centers the screw unit within the groove in the first profiled bar, and the geometry of the shank of the screw unit is designed such that it engages with a centering effect in the groove in the second profiled bar, or the at least one sliding block that is inserted into the groove in the second profiled bar has a centering element which is arranged thereon and has a width which essentially corresponds to the width of the groove in the second profiled bar and, as a result, the sliding block is centered within the groove.

A particularly preferred refinement is distinguished by the fact that the cylindrical shank of the screw unit has a diameter which essentially corresponds to the width of the groove in the second profiled bar and, when the shank of the screw unit is inserted into the plate connector unit, it projects, at least in some areas, into the groove in the second profiled bar.

In the connecting device according to the invention, the additionally integrally molded centering means known from the prior art can be dispensed with completely. The centering action is performed by the screw units themselves, in that on the one hand the screw head can be arranged with a centering effect in the groove in the first profiled bar, and on the other hand the shaft can be inserted with a centering effect into the groove in the second profiled bar. As a result, the plate connector unit can be configured to be more compact. At the same time, simple assembly and reliable centering are ensured.

A refinement which is particularly simple in design terms and, in addition to simple assembly, ensures reliable centering, is distinguished by the fact that on the one hand the screw head has a centering effect and on the other hand the at least one sliding block inserted into the groove in the second profiled bar has a centering element which is arranged thereon and which has a width which essentially corresponds to the width of the groove in the second profiled bar, and as a result, the sliding block is centered within the groove.

According to a particularly preferred exemplary embodiment, the centering element is designed such that it can be plugged onto the sliding block. The centering element can also be integrally molded onto the sliding block.

Particularly good centering properties may be achieved if the diameter of the recess in the plate connector unit essentially corresponds to the diameter of the shank of the screw unit.

An advantageous refinement of the connecting device according to the invention is distinguished by the fact that there are two screw units and one plate connector unit with, correspondingly, two continuous recesses, and both screw units can be screwed into one sliding block each or into a common sliding block.

It is particularly preferred for the screw units to be arranged releasably on the plate connector unit via a retaining unit, the retaining unit preferably being designed as a retaining ring. As a result, the plate connector units, in conjunction with the screw units, form an assembly unit which can intrinsically be handled as one component. At the same time, the sliding blocks can already be screwed on slightly. In order to assemble the plate connector unit and to produce the connection between the first profiled bar and the second profiled bar, first of all the plate connector unit with inserted screw units and sliding blocks slightly screwed on are fastened by means of a central screw to the end of the first profiled bar. In the process, the screw heads of the screw units are inserted with a centering effect into the grooves in the first profiled bar. Assembly of the second profiled bar is then begun, by the sliding blocks being pushed into the groove in the second profiled bar. Definitive anchoring is then carried out by tightening the screw units.

A particularly preferred refinement of the connecting device according to the invention is distinguished by the fact that the plate connector unit has at least one outwardly open, continuous slot over the thickness of the plate connector unit. Preference is given in this case to a development in which the width of the slot corresponds to the width of the groove, and the depth of the slot corresponds to the depth of the groove in the first profiled bar.

As a result of the provision of a slot, the connecting device according to the invention can also be used for constructions in which panel elements are arranged between the profiles, without the panels having to be released. The panels can simply be arranged to be held in a locking manner in the respectively adjacent grooves, without the plate connector unit interfering. In addition to the direct insertion of panels, it is also possible for frame profiles for panels to be used.

A preferred refinement is distinguished by the fact that the plate connector unit has the slot in a central edge area and the recess in the opposite central edge area.

A design variant of the connecting device according to the invention which is particularly preferred with regard to the variability of its intended use is distinguished by the fact that the plate connector unit has a recess in each case in the two remaining central edged areas. There is thus a total of three recesses for the screw fixing, so that in the direction in which the slot is located opposite a recess, the plate connector unit can be inserted without difficulty for the assembly of panel elements, it being possible for the profiled bar to he connected via a centering screw. In the direction perpendicular to this, it is possible to connect the other profiled bar via two centering screws, so that a connection with a high strength can be ensured, it not being possible for any panel elements to be inserted in this connecting direction.

A particularly preferred configuration of the connecting device according to the invention is distinguished by the fact that the common sliding block has, between its two recesses with internal threads for the screws, a central recess through which a tool can be led to screw the central screw into the recess in the first profiled bar, or through which the central screw itself can be led. Using this refinement, it is possible to implement a connection with particularly high connecting forces. At the same time, a preassembled unit which is easy to handle can be formed from the plate unit, the two screw units, the central screw and the common sliding block.

Further embodiments and advantages of the invention emerge from the features further listed in the claims and from the exemplary embodiments specified below. The features of the claims can be combined with one another in any desired manner, to the extent that they are not obviously mutually exclusive.

BRIEF DESCRIPTION OF THE DRAWINGS

The invention and advantageous embodiments and developments of the same will be described in more detail and explained below using examples illustrated in the drawing. The features to be taken from the description and the drawing can intrinsically be used individually or together in any desired combination, according to the invention. In the drawing.

WAYS OF IMPLEMENTING THE INVENTION

Figure 1:
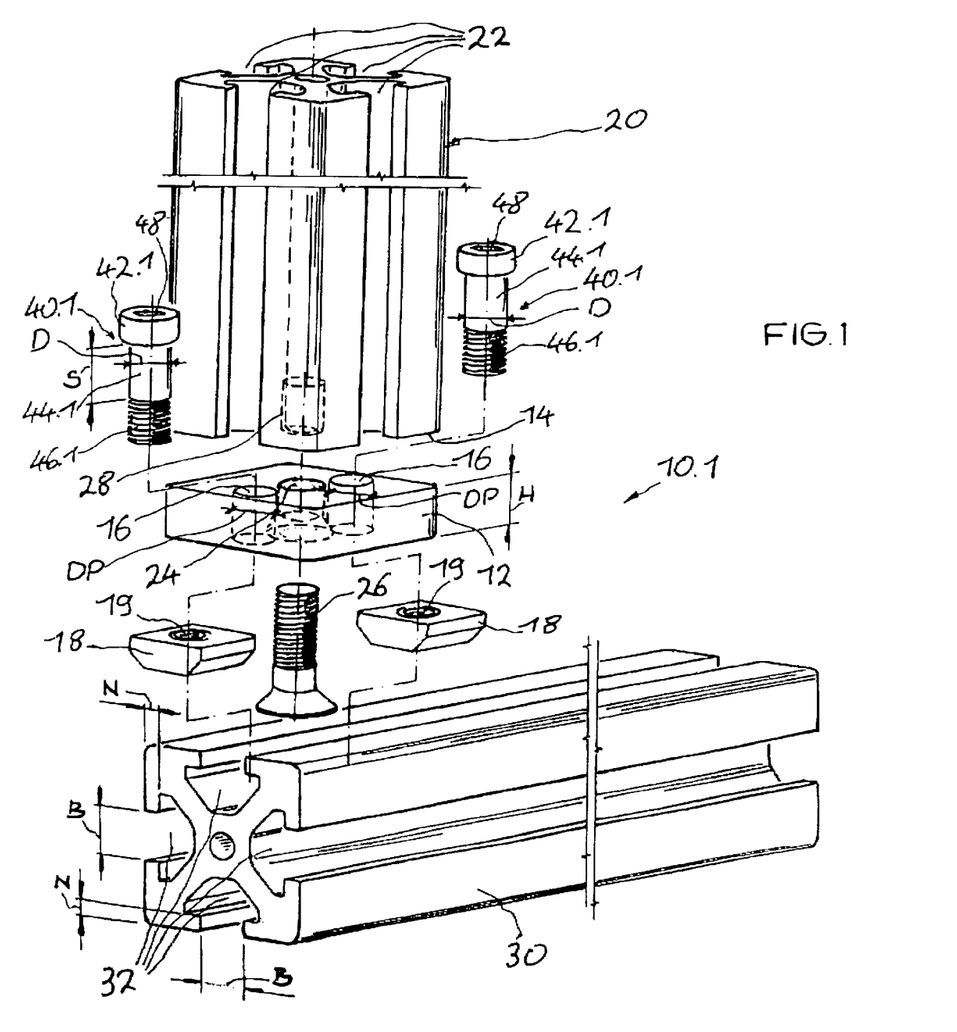
FIG. 1 shows a schematic detailed exploded perspective view of the connection of a first profiled bar to a second profiled bar, using a plate connector unit with centering screw units.
Figure 2:
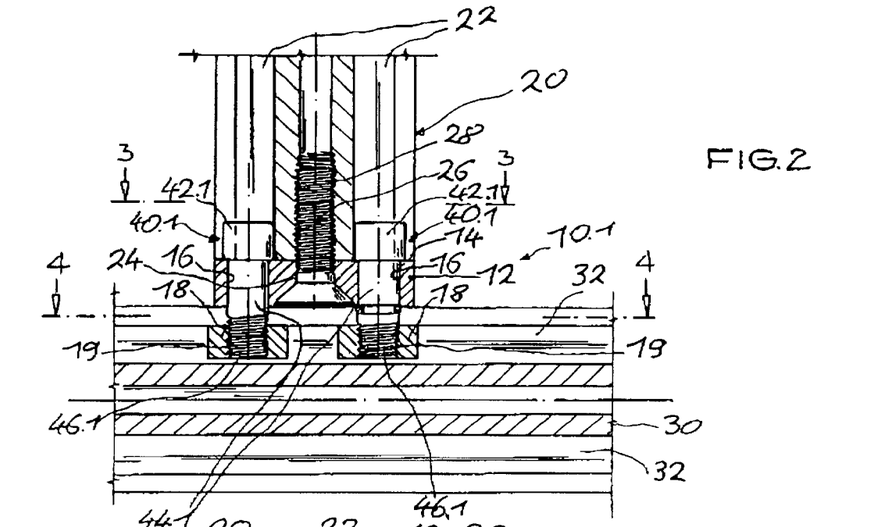
FIG. 2 shows a schematic section in the longitudinal direction of the second profiled bar according to FIG. 1, through the connecting device.

FIG. 1 illustrates in schematic form a first embodiment of a connecting device 10.1 for a first profiled bar 20 and a second profiled bar 30, using a plate connector unit 12, in detail in an exploded perspective view. The two profiled bars 20, 30 are arranged at right angles to each other. The profiled bars 20, 30 are constructed as extruded aluminum sections and each have, on their outer longitudinal side, a groove 22 with an undercut area, into which a sliding block (known per se) can be inserted. The groove width of the grooves 32 of the second profiled bar 30 is designated by B in FIG. 1. The depth of the groove 32 in the area of the width B is designated by N in FIG. 1.

The lower end 14 of the first profiled bar 20 points toward the upper side of the second profiled bar 30, which extends horizontally in FIG. 1. On this end 14, the plate connector unit 12, which is essentially constructed as a cube with a square outline corresponding to the outer circumferential contour of the first profiled bar 20, is connected to the first profiled bar 20 by a central screw unit 26. For this purpose, the plate connector unit 12 has a central, continuous recess 24, and there is on the first profiled bar 20, at the center, a recess 28 with an internal-thread, into which the screw unit 26 can be screwed. The central recess 28 has on the underside a conically tapering area, which is formed to accord with the conical head of the screw unit 26, so that the latter is present flush with the surface in the plate connector unit 12.

Symmetrically in relation to the central recess 24, on the connector unit 12 there are two further continuous recesses 16 with a diameter DP. The plate connector unit 12 has a height H.

In order to anchor the first profiled bar 20 with the plate connector unit 12 to the second profiled bar 30, in each case a screw unit 40.1 is inserted from below into two opposite grooves 22 in the first profiled bar 20, that is to say before the plate connector unit 12 is connected via the screw unit 26 to the end 14 of the first profiled bar 20, said screw units 40.1 having a cylindrical screw shank 44.1 with a smooth outer wall, which is lead through the recesses 16 in the plate connector unit 12. The screw shank 44.1 has a diameter D which essentially corresponds to the diameter DP of the recesses 16 in the plate connector unit 12. The length of the screw shank 44.1 is indicated by S in FIG. 1. This screw shank 44.1 is adjoined by an external threaded area 46.1.

The external threaded area 46.1 is in each case screwed into an internal thread 19 in a sliding block 18, said sliding block 18 being inserted in a corresponding position into the groove 32 facing the plate connector unit 12 in the second profiled bar 30.

Figure 3:
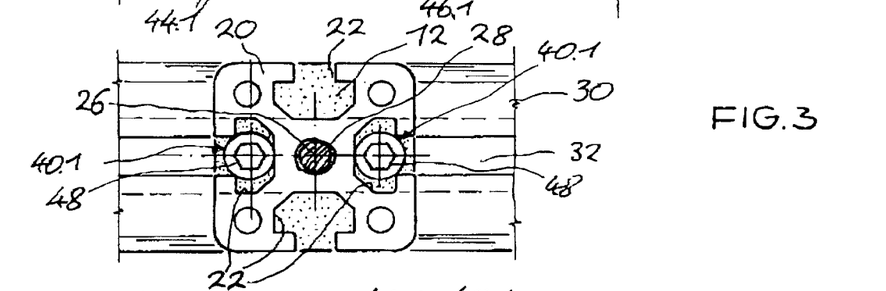
FIG. 3 shows a schematic section through the connecting device along the section line 3—3 in FIG. 2.
Figure 4:
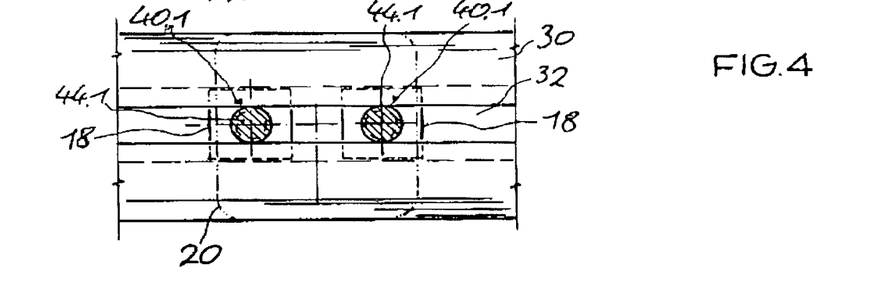
FIG. 4 shows a schematic section through the connecting unit along the section line 4—4 in FIG. 2.

The screw unit 40.1 has a cylindrical screw head 42.1 with a polygonal inner contour 48 for the attachment of a tool. The outer contour of the screw head 42.1 is in this case dimensioned such that when it is inserted into the groove 22, it is present with a centering effect in the groove 22 along three envelope lines 46 (FIG. 3). As a result, the plate connector unit 12 is likewise arranged with a centering effect on the first profiled bar 20.

At the same time, the length S of the screw shank 44.1 is dimensioned such that it is greater than the height H of the plate connector unit 12, and therefore in some areas reaches into the groove 32 in the second profiled bar 30. At the same time, the diameter D of the screw shank 44.1 is designed to be essentially the same as the width B of the groove 32 in the second profiled bar 30, so that by inserting the screw shank 44.1 into the groove 32, a centering effect between the plate connector unit 12 and the second profiled bar 30 is likewise carried out by the screw unit 40.1. The actual anchoring is then carried out by tightening the screw units 40.1, their external threaded area 46.1 being screwed into the internal thread 19 in the grooved block 18.

Figure 5:
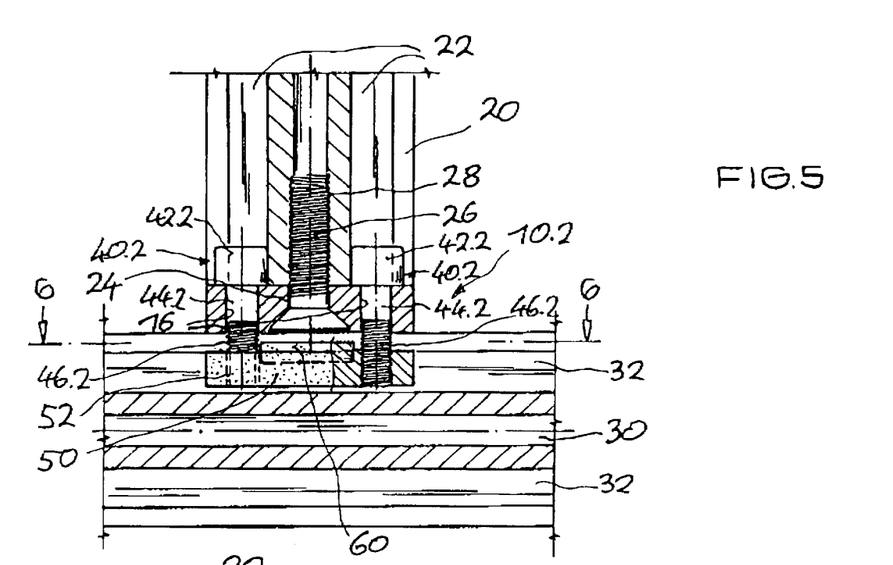
FIG. 5 shows a schematic longitudinal section in the direction of the longitudinal axis of the second profiled bar of a second exemplary embodiment of a connecting device.
Figure 6:
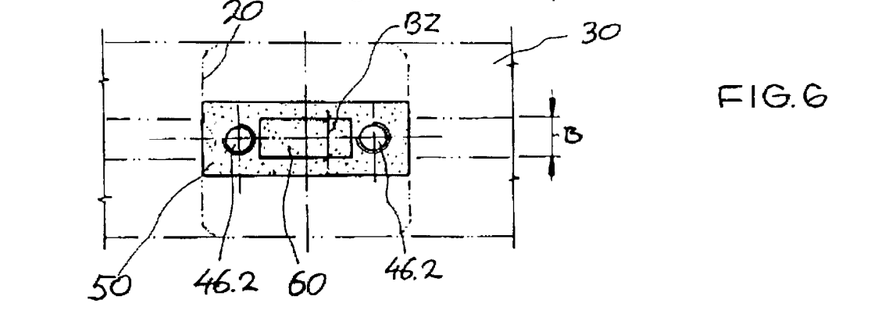
FIG. 6 shows a schematic section through the connecting device along the section line 6—6 according to FIG. 5.

An alternative embodiment of a connecting device 10.2 is illustrated in FIGS. 5 and 6. Identical components bear the same reference symbol and will not be explained again. Use is likewise made here of screw units 40.2, whose screw head 42.2 has the same geometry as the screw head 42.1 according to the exemplary embodiment of FIGS. 1 to 4. Here, screw head 42.2 likewise performs a centering action between plate connector 12 and the end 14 of the first profiled bar 20.

The centering action between plate connector 12 and the second profiled bar 30 is, however, not performed by the screw shank element 44.2 of the screw unit 40.2 but by a centering unit 60 that is pushed onto a sliding block 50 and has a width BZ which essentially corresponds to the width B of the groove 32 in the second profiled bar and projects into the latter in some areas. The grooved block 50 has two recesses with internal threads 52, into which in each case one screw unit 40.2 can be screwed from above.

Figure 7:
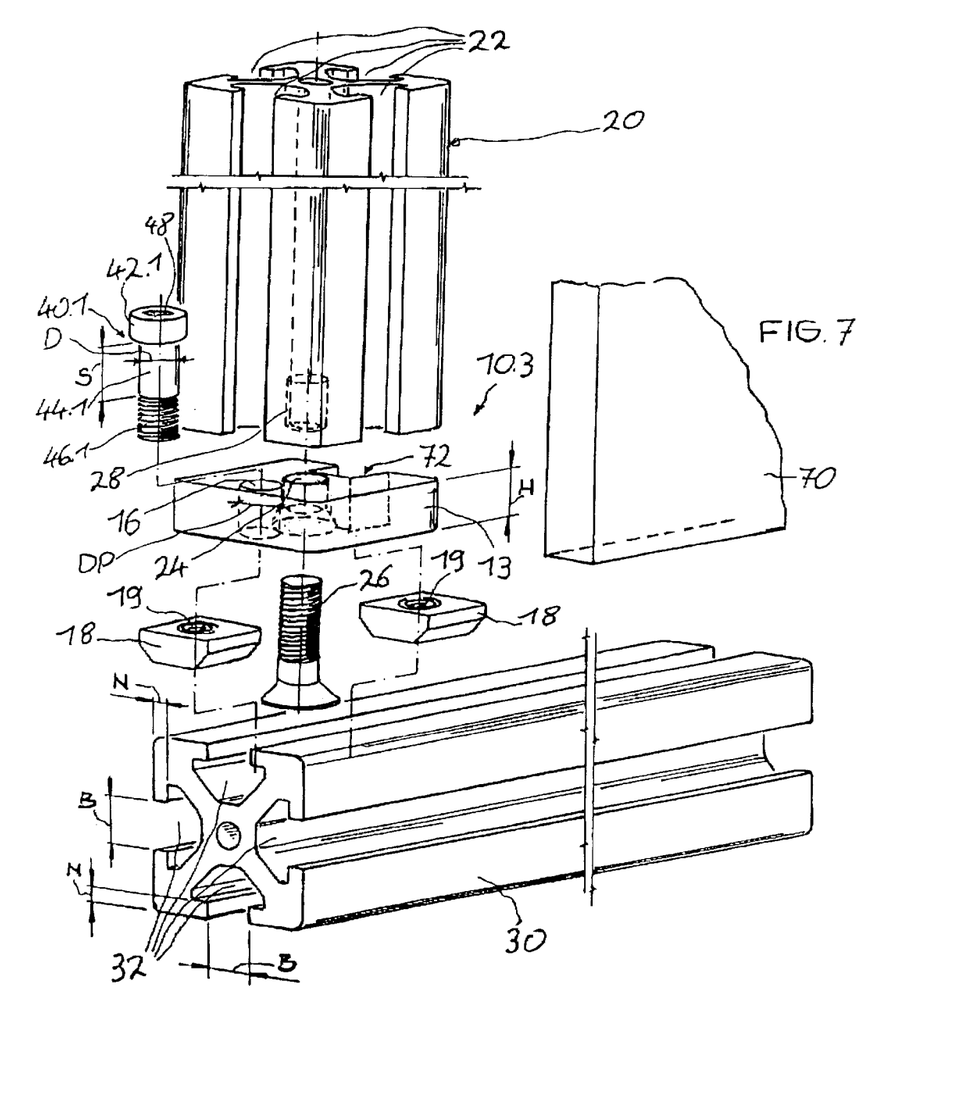
FIG. 7 shows a schematic detailed exploded perspective view of the connection of a first profiled bar to a second profiled bar using a plate connector unit with centering screw units and a slot for the connection of a panel element.

FIG. 7 illustrates a connecting device 10.3 which has a modified plate connector unit 13. Identical components to those in the connecting device 10.1 according to FIG. 1 bear the same reference symbol and will not be explained again.

As distinct from the plate connector unit 12 described above, the plate connector unit 13 according to FIG. 7 has only one recess 16 for a centering screw 40.1 In the opposite center edge of the plate connector unit there is an outwardly open, continuous slot 72 over the entire thickness (H) of the plate connector unit 13. The slot depth L essentially corresponds to the depth of the groove 22 in the profiled bar 20. The width B of the slot essentially corresponds to the width of the groove 22 or 32. As a result of the provision of the slot 72, it is easily possible to insert a panel element 70 in a locking manner into the groove 32 and the groove 22 in the second or first profiled bar 30, without the panel element 70 having to be removed at the location of the plate connector unit 30.

Figure 8:
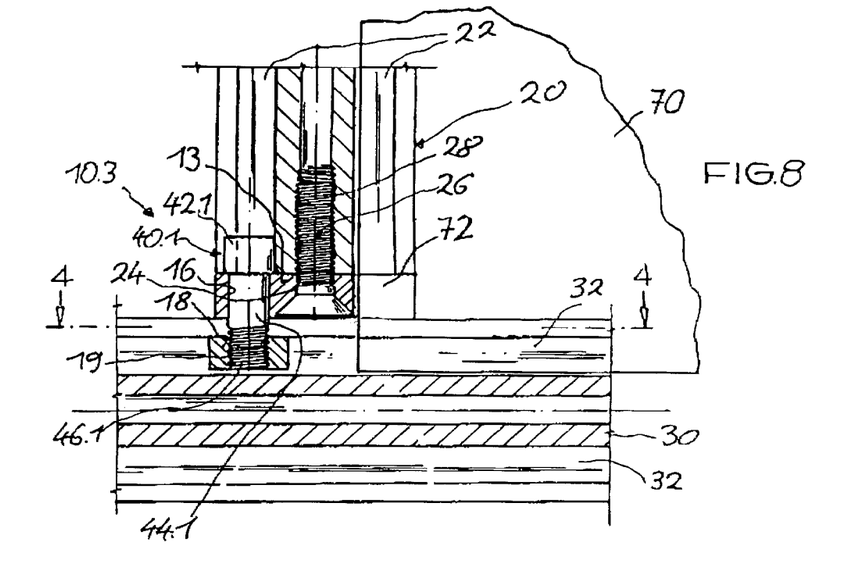
FIG. 8 shows a schematic section in the longitudinal direction of the second profiled bar according to FIG. 7, through the connecting device.

In the illustration in FIG. 8, a transparent panel element has been assumed, so that specific edges of the profiled bars are visible.

Figure 9:
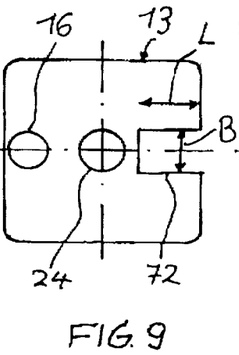
FIGS. 9–11 show views of different design variants of the plate connector unit.

The plate connector unit 30 is illustrated in a plan view in FIG. 9.

Figure 10:
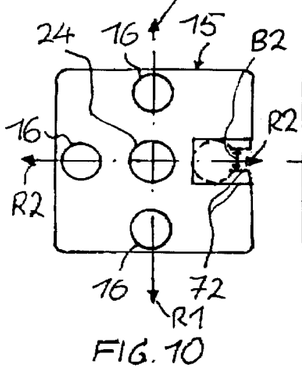

A further refinement of a plate connector unit 15 is shown in plan view in FIG. 10. Here, two further recesses 16 for centering screws are additionally provided, and are arranged in the central edge area on an axis of symmetry (direction arrow R1) perpendicular to the axis of symmetry (direction arrow R2) extending through the recess 16 and the slot 72. This means that a plate connector unit 15 is available which can be inserted in the direction R2 for the connection of panel elements, it being possible for the second profiled bar located underneath to be connected via a centering screw. In the direction R1 perpendicular to this, a plate connector unit 15 is available in which the second profiled bar located underneath can be connected via two centering screws, without it being possible for panel elements to be inserted, so that a connection with a high strength is available.

Figure 11:
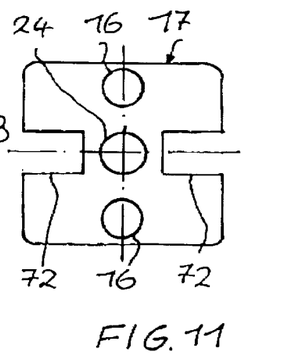

FIG. 11 illustrates a further design variant of a plate connector unit 17, in which there are two opposite slots 72.

At right angles to this, in each case a recess 16 for a centering screw is arranged in the respective central edge area. The central recess 24 is present in all the design variants.

As an alternative, FIG. 10 illustrates, dashed in the area of the right-hand slot, a further design contour shape of the slot. Toward the opening, the slot has a width B2 which is smaller than the width of the groove B. Illustrated dashed adjacent thereto in the interior is a circular recess, whose diameter corresponds to the recesses 16. As a result, this embodiment can be used both for the centering connection of the profiles via screw elements and for the use of plate elements with a width B2.

Figure 12:
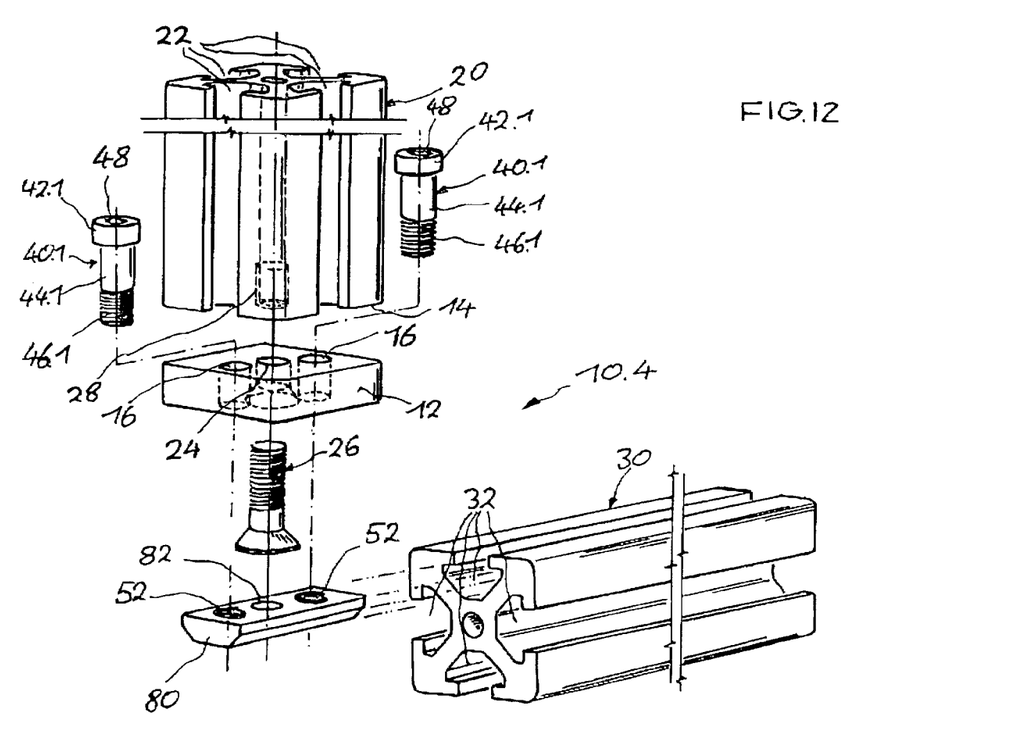
FIG. 12 shows a schematic detailed exploded perspective view of a third exemplary embodiment of a connecting device.

FIG. 12 shows, in an exploded illustration, a connecting device 10.4 which is preferably used. Its construction essentially corresponds to the connecting device 10.2 according to FIGS. 5 and 6. Identical components bear the same reference symbol and will not be explained again. The difference from the connecting device 10.2 in the case of the connecting device 10.4 resides in the fact that a common sliding block 80 is used, which has a central recess 82 between the two internal threads 52. This recess 82 provides a great advantage. This is because a preassembled assembly part can be produced, this being illustrated in the left-hand area in FIG. 13. This preassembly component comprises the plate unit 12, the screw units 40, the central screw 26 and the common sliding block 80. The screw units 40.1 are screwed to some extent into the internal threads 52 in the sliding block 18. At the same time, the central screw 26 is inserted into the recess 24. In this state, it is easily possible, by attaching a tool 84 from below through the recess 82 in the sliding block 80, to screw the central screw 26 into the recess 28 in the first profiled bar 20. After this connection has been produced, the common sliding block 80 can easily be inserted into the groove 32 in the second profiled bar 30 and, after reaching its predefined position, clamped by the screws 40.1. Here, the tool 84 is designed as a hexagonal key, which engages in a corresponding internal hexagonal contour in the head of the central screw 26.

Figure 13:
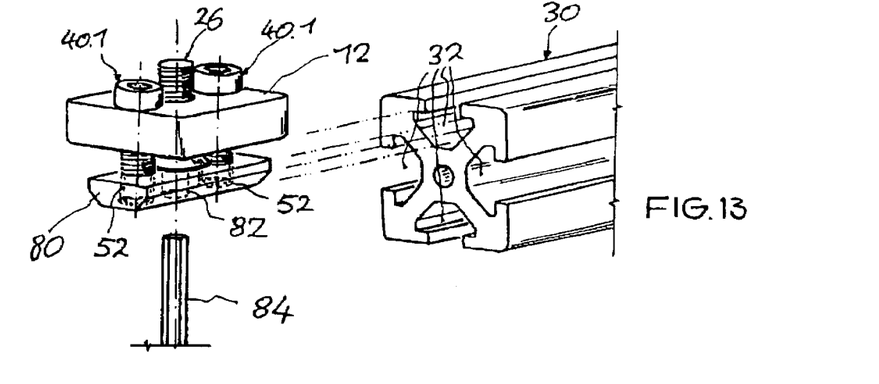
FIG. 13 shows a schematic detailed exploded perspective view of a preassembled assembly element comprising plate unit, screws, central screws and common sliding block.

The preassembled assembly component according to FIG. 13 simplifies and shortens the assembly on site considerably. At the same time, by means of the common sliding block 80, in conjunction with the screw units 40.1 screwed in at a distance, a connection which can be highly stressed can be produced between the first profiled bar 20 and the second profiled bar 30.

What is claimed is:

1. A connecting device for connecting at least a first profiled bar and a second profiled bar that are essentially perpendicular to one another and have grooves, comprising:
    at least one sliding block positioned to slidably engage the second profiled bar;
    a plate connector unit having at least on recess, said plate connector unit being arranged proximate to the at least one sliding block;
    at least one screw unit extending in said recesses in the plate connector unit such that, along with the at least one sliding block, the plate connector unit is fastened to an end of the first profiled bar and anchored in a groove in the second profiled bar by the at least one screw unit,
    wherein one of a geometry of a screw head of the at least one screw unit is configured such that the screw unit is centered within the groove in the first profiled bar and a geometry of a shank of the at least one screw unit is configured such that the at least one screw unit is centered when engaged with the groove in the second profiled bar; and wherein a cylindrical shank of the at least one screw unit has an outer surface that abuts a surface of the groove in the second profiled bar, and when the cylindrical shank of the at least one screw unit is inserted into the plate connector unit, the cylindrical shank projects, at least in some areas, into the groove in the second profiled bar, the screw head has a cylindrical contour which rests, along three envelope lines, with a centering effect on an inner contour of the groove in the first profiled bar, and the plate connector unit has a planar upper and lower surface along its entire surfaces.

2. The connecting device of claim 1, wherein a diameter of the recess essentially corresponds to the diameter of the shank of the screw unit.

3. The connecting device of claim 1, wherein there are two screw units and one plate connector unit with correspondingly continuous recesses, and one of the two screw units can be screwed into one sliding block each and into a common sliding block with corresponding internal threads.

4. The connecting device of claim 1, wherein the screw head of the screw unit has a polygonal internal contour for a tool to be attached.

5. The connecting device of claim 1, wherein the plate connector unit has at least one outwardly open, continuous slot over the thickness of the plate connector unit.

6. The connecting device of claim 5, wherein the width of the slot corresponds to the width of the groove.

7. The connecting device of claim 6, wherein the depth of the slot corresponds to the depth of the groove in the first profiled bar.

8. The connecting device of claim 5, wherein the plate connector unit has the slot in a central edge area and the recess in the opposite central edge area.

9. The connecting device of claim 5, wherein the plate connector unit has the slot in opposite central edge areas, and the recess in two other transversely positioned central edge areas.

10. The connecting device of claim 8, wherein the plate connector unit has the recess in each remaining central edge area.

\* \* \* \* \*